(12) United States Patent
Miwa et al.

(10) Patent No.: US 11,704,911 B2
(45) Date of Patent: Jul. 18, 2023

(54) APPARATUS AND METHOD FOR IDENTIFYING OBSTACLE AROUND VEHICLE

(71) Applicants: DENSO CORPORATION, Kariya (JP); TOYOTA JIDOSHA KABUSHIKI KAISHA, Toyota (JP)

(72) Inventors: Takuya Miwa, Kariya (JP); Takayuki Hiromitsu, Kariya (JP); Masumi Fukuman, Toyota (JP); Akihiro Kida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/068,236

(22) Filed: Oct. 12, 2020

(65) Prior Publication Data
US 2021/0110175 A1    Apr. 15, 2021

(30) Foreign Application Priority Data
Oct. 14, 2019    (JP) .............................. JP2019-188273

(51) Int. Cl.
G06K 9/00      (2022.01)
G06V 20/58     (2022.01)
(Continued)

(52) U.S. Cl.
CPC .......... *G06V 20/58* (2022.01); *G06F 18/2113* (2023.01); *G06F 18/24* (2023.01);
(Continued)

(58) Field of Classification Search
CPC .......... G06T 7/269; G06T 2207/10016; G06T 2207/30241; G06T 7/20;
(Continued)

(56) References Cited

U.S. PATENT DOCUMENTS

2005/0203706 A1 *  9/2005  Ihara ................... G06V 20/588
                                                  701/1
2007/0139565 A1 *  6/2007  Nishiuchi .............. G06V 20/56
                                                  348/E5.037
(Continued)

FOREIGN PATENT DOCUMENTS

JP    2006-245677 A    9/2006
JP    2009-083632 A    4/2009
(Continued)

*Primary Examiner* — Alex Kok S Liew
(74) *Attorney, Agent, or Firm* — Maschoff Brennan

(57) ABSTRACT

In an apparatus for identifying an obstacle around a vehicle, an acquirer is configured to acquire an image captured by a camera mounted to the vehicle. An extractor is configured to extract feature points of the image. A generator is configured to generate an optical flow that is a movement vector from each of the feature points of the image acquired before the current time to a corresponding feature point of the image acquired at the current time. A classifier configured to classify the optical flows into groups each corresponding to an object in the image based on pixel positions of the feature points. An identifier is configured to, for each of the groups that the optical flows are classified by the classifier into, identify whether an object corresponding to the group in the image is a stationary object or a moving object based on a degree of variability in lengths of the optical flows of the group.

11 Claims, 10 Drawing Sheets

(51) Int. Cl.
*G06V 10/75* (2022.01)
*G06F 18/24* (2023.01)
*G06F 18/2113* (2023.01)
*G06V 30/24* (2022.01)

(52) U.S. Cl.
CPC ............ *G06V 10/751* (2022.01); *G06V 10/76* (2022.01); *G06V 30/2504* (2022.01)

(58) Field of Classification Search
CPC . G06T 2207/30232; G06T 5/005; G06T 5/50; G06T 7/246; G06T 7/579; G06T 2207/30196; G06T 11/60; G06T 2207/20221; G06T 2207/30212; G06T 2207/30236; G06T 2207/30244; G06T 3/4007; G06T 3/4038; A63F 2300/1087; G06F 1/1626; G06F 1/1686; G06F 2200/1637; G06F 3/0346
See application file for complete search history.

(56) References Cited

U.S. PATENT DOCUMENTS

2008/0205706 A1\* 8/2008 Hongo ...................... B60R 1/00
382/104
2013/0235201 A1 9/2013 Kiyohara et al.
2017/0278252 A1\* 9/2017 Kaufmann .............. G06T 7/215

FOREIGN PATENT DOCUMENTS

| JP | 2009-146153 A | 7/2009 |
| JP | 4674179 B2 | 1/2011 |
| JP | 2011-065442 A | 3/2011 |

\* cited by examiner

| -1 | 0 | 1 |
|----|---|---|
| -2 | 0 | 2 |
| -1 | 0 | 1 |

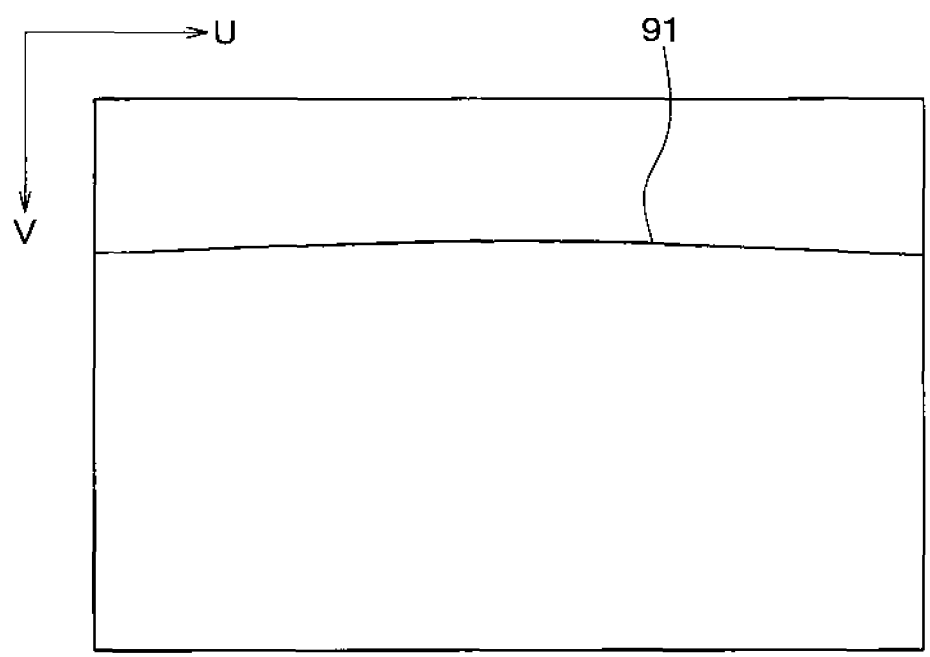

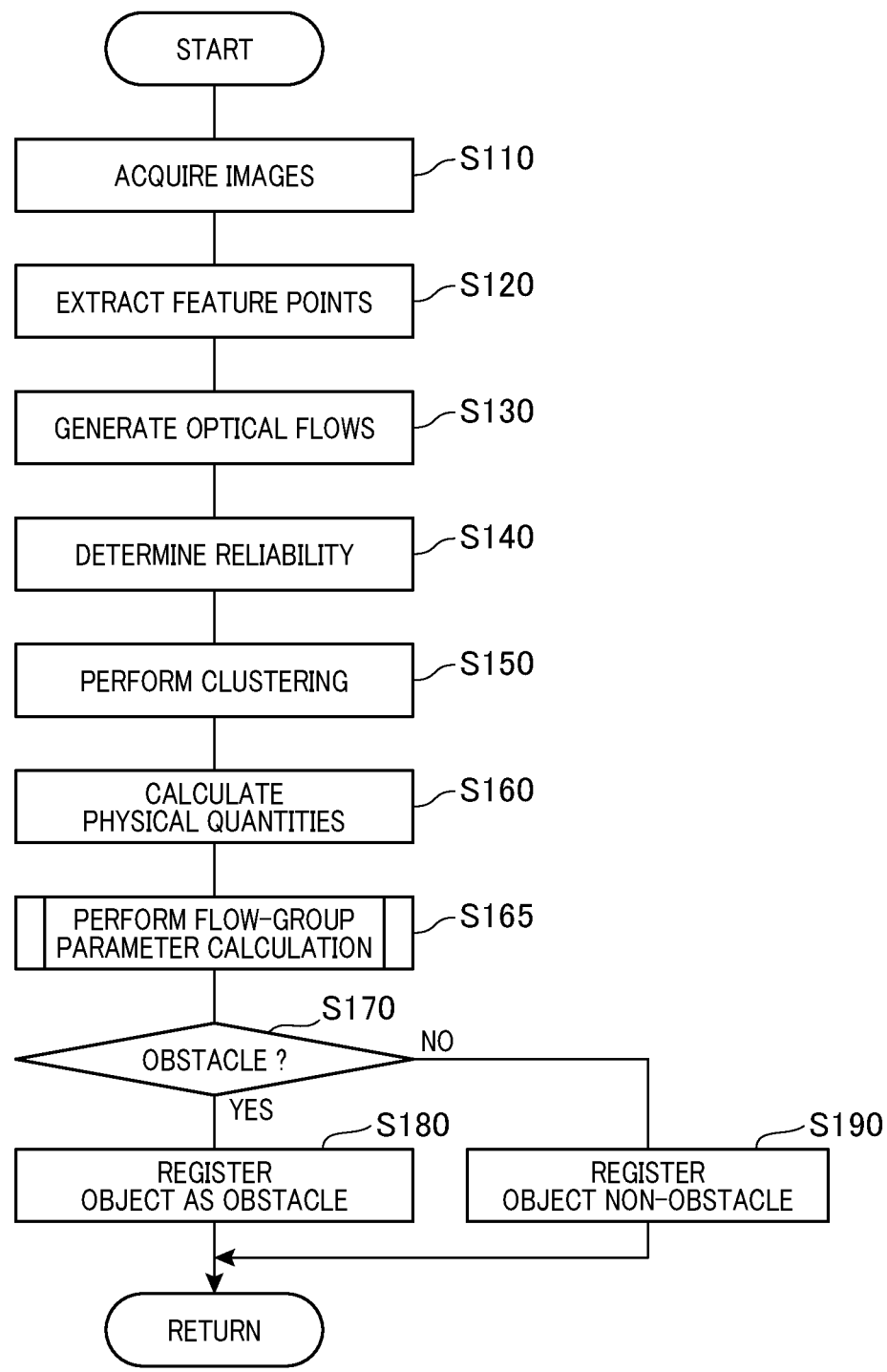

TRAVEL DIRECTION OF VEHICLE

APPARATUS AND METHOD FOR IDENTIFYING OBSTACLE AROUND VEHICLE

CROSS-REFERENCE TO RELATED APPLICATION

This application is based on and claims the benefit of priority from earlier Japanese Patent Application No. 2019-188273 filed on Oct. 14, 2019, the description of which is incorporated herein by reference.

BACKGROUND

Technical Field

This disclosure relates to an apparatus and a method for identifying an obstacle around a vehicle.

Related Art

Conventionally, an apparatus is known for detecting a moving object during travel of a vehicle equipped with the apparatus.

BRIEF DESCRIPTION OF THE DRAWINGS

In the accompanying drawings:

FIG. 4 is a Sobel filter used to calculate a gradient in a V-direction;
FIG. 5 is an example image captured by a camera;
FIG. 6 is a flowchart of an obstacle identification process performed by an image processor.

DESCRIPTION OF SPECIFIC EMBODIMENTS

Figure 1A:
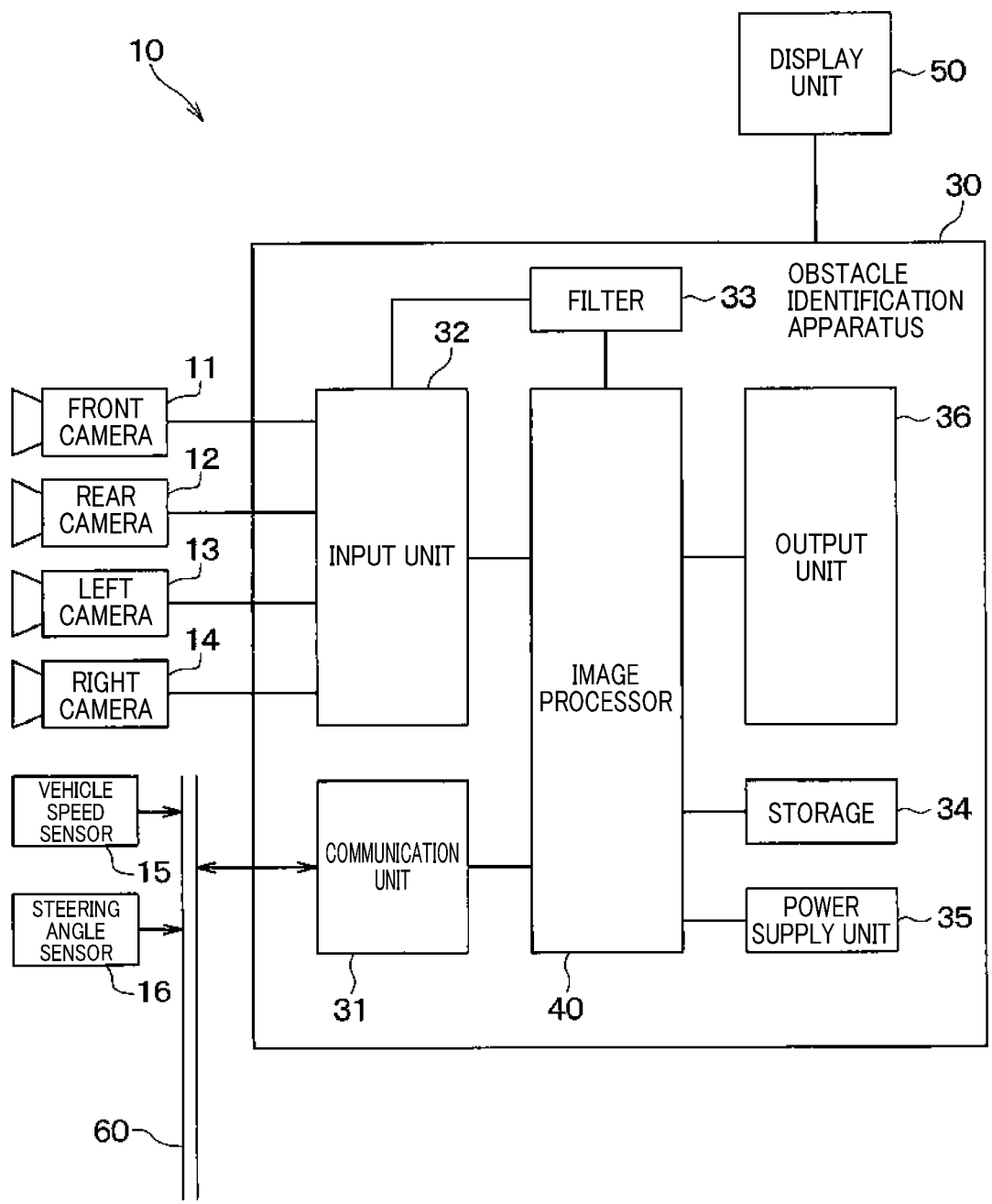
FIG. 1A is a schematic block diagram of an obstacle identification system according to one embodiment.

As a result of detailed studies by the inventor, regarding the known apparatus as disclosed in JP-A-2009-146153, when the vehicle equipped with the apparatus is traveling, an optical flow of a stationary object is oriented in a direction opposite to a travel direction of the vehicle. This allows a determination to be made as to whether an object of interest is a stationary object or a moving object. However, if the object of interest is a stationary object having a regular or substantially regular pattern, such as a fence, an optical flow OP connecting feature points that do not correspond to each other may be generated. This may cause an optical flow oriented in a direction different from the opposite direction to the travel direction of the own vehicle to be output, which may cause the stationary object to be mistakenly detected as a moving object.

In view of the foregoing, it is desired to have a technique for identifying obstacles with higher accuracy.

Hereinafter, exemplary embodiments of the present disclosure will be described in detail with reference to the accompanying drawings, in which like reference numerals refer to like or similar elements regardless of reference numerals and duplicated description thereof will be omitted.

In one embodiment of the present disclosure, an obstacle identification system 10 mounted to a vehicle 90 includes an obstacle identification apparatus 30. The obstacle identification system 10 is configured to identify whether an object around the vehicle 90 is a stationary object or a moving object. The obstacle identification system 10 is further configured to identify whether an object identified as a moving object around the vehicle 90 is a fluid, such as a misty or mist-like object including a liquid and a gas and having unclear boundaries, or an obstacle, such as a person, a preceding vehicle or the like. The obstacle identification system 10 will now be described in detail.

As illustrated in FIG. 1A, the obstacle identification system 10 includes a front camera 11, a rear camera 12, a left camera 13, a right camera 14, a vehicle speed sensor 15, a steering angle sensor 16, the obstacle identification apparatus 30, and a display unit 50. The vehicle speed sensor 15, the steering angle sensor 16, and the obstacle identification apparatus 30 are communicatively connected to an in-vehicle local area network (in-vehicle LAN) 60, such as a controller area network (CAN).

Figures 2, 3:
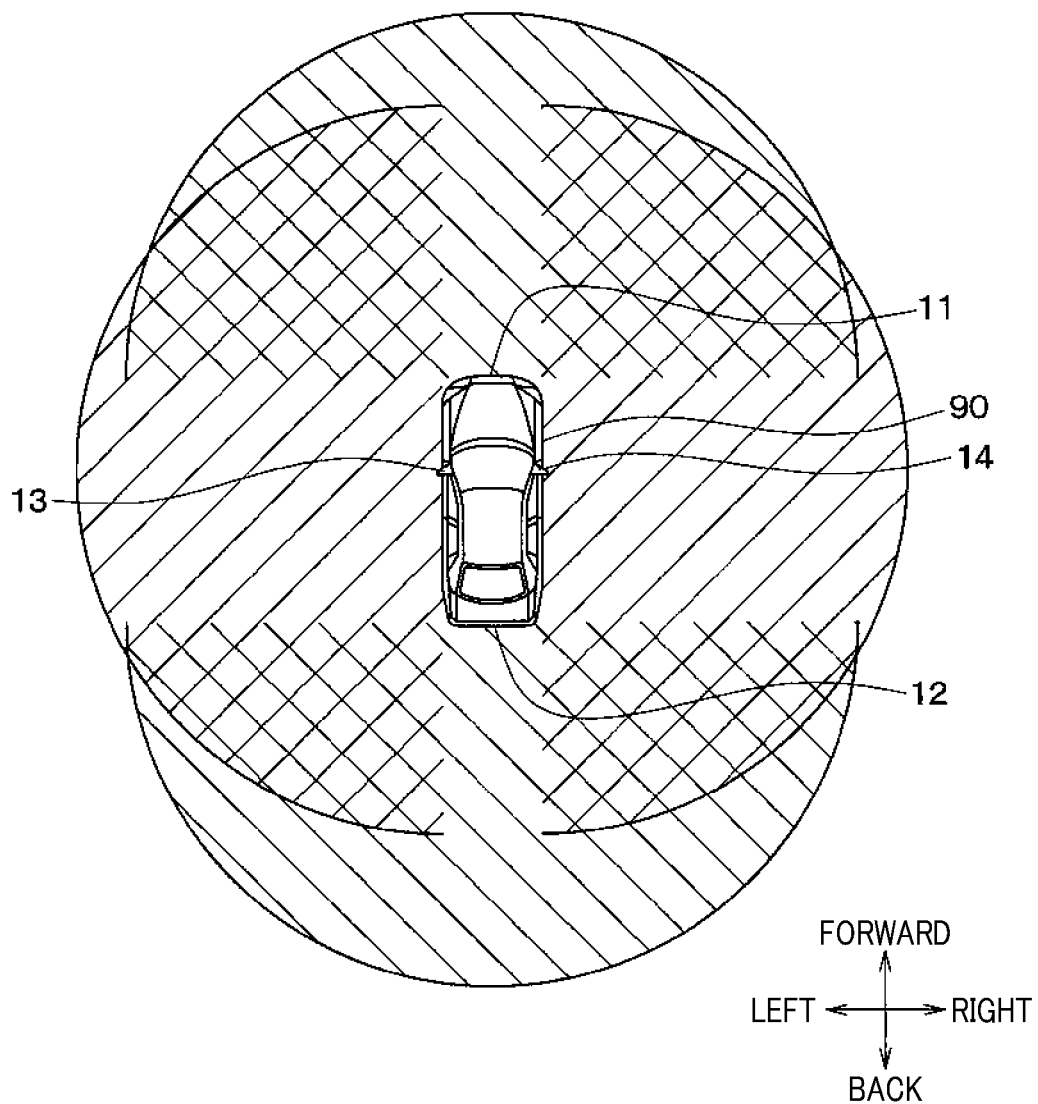
FIG. 2 is a top view of imaging fields of cameras mounted to a vehicle.
FIG. 3 is a Sobel filter used to calculate a gradient in a U-direction.

Each of the front camera 11, the rear camera 12, the left camera 13, and the right camera 14 is a monocular digital camera. Each of the front camera 11, the rear camera 12, the left camera 13, and the right camera 14 includes a fish-eye lens and has a viewing angle of 180 degrees. The front camera 11 is attached to, for example, an inside of a radiator grille (not shown) of the vehicle 90, and is viewing forward from the vehicle 90 as illustrated in FIG. 2. The rear camera 12 is attached to, for example, an under side of the rear end of the vehicle 90 and is viewing rearward relative to vehicle 90. The left camera 13 is mounted to, for example, an under side of the left side mirror of the vehicle 90 and is viewing leftward relative to the forward direction of the vehicle 90. The right camera 14 is mounted to, for example, an under side of the right side mirror of the vehicle 90 and is viewing rightward to the forward direction of the vehicle 90. Images captured by the front camera 11, the rear camera 12, the left camera 13, and the right camera 14 are output to the obstacle identification apparatus 30. In FIG. 2, an imaging field of each of the front camera 11, the rear camera 12, the left camera 13, and the right camera 14 is indicated by diagonal hatching. An overlap field where at least two of the imaging fields of the front camera 11, the rear camera 12, the left camera 13, and the right camera 14 overlap is indicated by cross hatching.

The vehicle speed sensor 15 outputs a signal responsive to an own-vehicle speed Vc that is a speed of the vehicle 90 to the in-vehicle LAN.

The steering angle sensor 16 outputs a signal responsive to a steering angle θs based on a steering operation of the vehicle 90 to the in-vehicle LAN.

The obstacle identification apparatus 30 includes a microcomputer as a main component. The microcomputer includes a central processing unit (CPU), a read-only memory (ROM), a random-access memory (RAM), a flash memory, an input/output interface (I/O), and a bus line connecting these components. More specifically, the obstacle identification apparatus 30 includes a communication unit 31, an input unit 32, a filter 33, a storage 34, a power supply unit 35, an output unit 36, and an image processor 40.

The communication unit 31 acquires the own-vehicle speed Vc from the vehicle speed sensor 15 and the steering angle θs from the steering angle sensor 16 via communications with the in-vehicle LAN.

The input unit 32 acquires images captured by the front camera 11, the rear camera 12, the left camera 13, and the right camera 14, and outputs acquired images to the filter 33 and the image processor 40.

The filter 33 is a dedicated filtering accelerator specific to filtering processes. The filter 33 calculates, for each pixel of interest of each image acquired from the input unit 32, a luminance value of the pixel of interest of an output image based on a luminance value of the pixel of interest and luminance values of pixels in the vicinity of the pixel of interest of the image acquired from the input unit 32. The filter 33 changes the resolution of for each image from the input unit 32. For example, the filter 33 performs image reduction for the Gaussian Pyramid, where the filter 33 calculates luminance values using the Gaussian filter for noise removal. The filter 33 calculates luminance values using a Sobel filter for edge detection, as illustrated in FIGS. 3 and 4. Therefore, for each image from the input unit 32 and its reduced images, the filter 33 calculates luminance values using the Gaussian filter and the Sobel filter and outputs the calculated values to the image processor 40.

FIG. 3 illustrates an example of the Sobel filter used to calculate U-directional gradient components of each of images captured by the front camera 11, the rear camera 12, the left camera 13, and the right camera 14, as illustrated in FIG. 5. FIG. 4 illustrates an example of the Sobel filter used to calculate V-directional gradient components of each of images captured by the front camera 11, the rear camera 12, the left camera 13, and the right camera 14, as illustrated in FIG. 5. In FIG. 5, the U-direction (corresponding to a first direction) is a horizontal direction in the image, where the positive U-direction is a horizontal, rightward direction in the image. The V-direction is a vertical direction in the image, where the positive V-direction (corresponding to a second direction) is a vertical, downward direction in the image. FIG. 5 illustrates an example image captured by any one of the front camera 11, the rear camera 12, the left camera 13, and the right camera 14, where a horizon 91 is imaged.

The storage 34 includes a RAM, a ROM, a flash memory, and the like, and stores computer programs to be executed by the image processor 40 described later and types of objects identified by the image processor 40.

The power supply unit 35 supplies electric power to the image processor 40 described later to execute the computer programs when an ignition switch of the vehicle 90 is turned on.

The output unit 36 outputs to the display unit 50 image data processed by the image processor 40 described later.

Figure 1B:
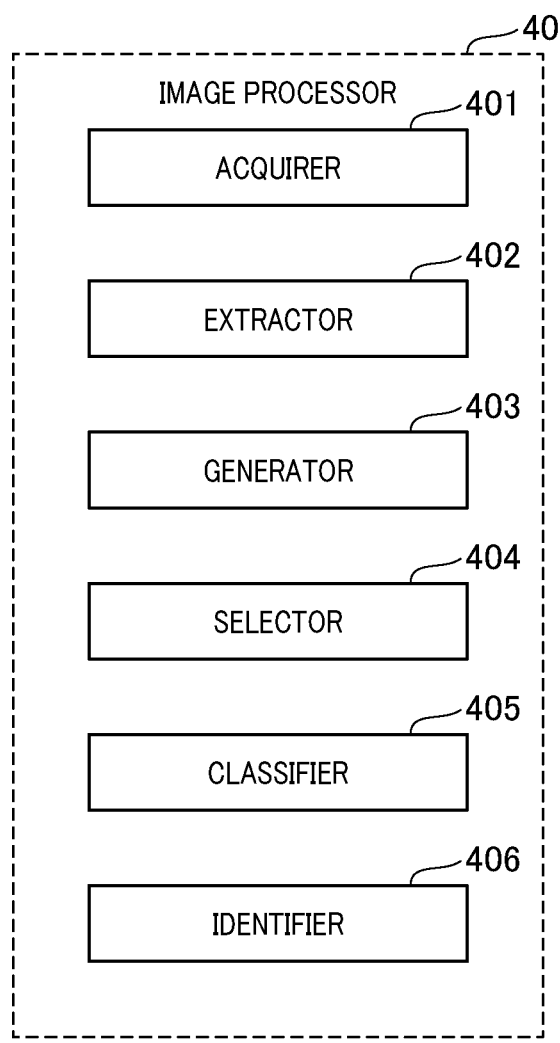
FIG. 1B is a functional block diagram of an image processor of FIG. 1.

As illustrated in FIG. 1B, the image processor 40 includes, as functional blocks, an acquirer 401 responsible for execution of step S110 of an object identification process described later, an extractor 402 responsible for execution of step S120, a generator 403 responsible for execution of step S130, a selector 404 responsible for execution of step S140, a classifier 405 responsible for execution of step S150, and an identifier 406 responsible for execution of steps S165, S170, S180, and S190. Functions of these blocks are implemented by the CPU reading the computer programs from the storage 34 and executing these programs using the RAM of the storage 34 as a work area.

The display unit 50 displays the image data received from the output unit 36, which allows the image data processed by the image processor 40 to be visible.

In the obstacle identification system 10 configured as above, the image processor 40 executes the computer programs, thereby identifying objects around the vehicle 90. More specifically, in the obstacle identification system 10, it is identified whether an object in an image captured by at least one of the front camera 11, the rear camera 12, the left camera 13, and the right camera 14 is a stationary object or a moving object. It is further identified whether the moving object is a misty object or an obstacle.

This object identification process to be performed by the image processor 40 with reference to the flowchart of FIG. 6. For example, the image processor 40 performs the object identification process by executing one or more computer programs stored in the ROM when the ignition switch of the vehicle 90 is turned on. For illustration purpose, a sequence of steps S110 to S190 are performed repeatedly every processing cycle T of tens to hundreds of milliseconds. In the following, for illustration purpose, the current processing cycle T is denoted by τ(n) as appropriate, and the previous processing cycle T relative to the current processing cycle T is denoted by τ(n−1) as appropriate, where n is a positive integer and represents the number of repetitions of the sequence of steps S110 to S190. Initial values used in the initial processing cycle τ(0) that begins immediately after the ignition switch of the vehicle 90 is turned on are preset values.

At step S110, the image processor 40 acquires from the input unit 32 an image captured by each of the front camera 11, the rear camera 12, the left camera 13, and the right camera 14, and acquires from the filter 33 the image processed by the filter 33.

Subsequently, at step S120, the image processor 40 extracts feature points of an object from each of the images acquired at step S110. To describe a feature point extraction process, a luminance value of each pixel of each image acquired from the input unit 32 is denoted by input luminance $Ic(U, V)$, where a luminance value of each pixel is a value ranging from 0 to 255. In the notation $Ic(U, V)$, U represents a U-directional position of the pixel relative to a reference position in the image, and V represents a V-directional position of the pixel relative to the reference position in the image.

More specifically, the image processor 40 calculates a luminance gradient Mc at each pixel of each image according to an equation (1) below. The luminance gradient Mc is a positive root of a sum of squares of Iu and Iv. Iu represents a U-directional gradient of the input luminance $Ic(U, V)$ and is calculated by the filter 33. Iv represents a V-directional gradient of the input luminance $Ic(U, V)$ and is calculated by the filter 33. Iu and Iv respectively correspond to a first gradient and a second gradient.

$$Mc=\sqrt{(Iu)^2+(Iv)^2} \qquad (1)$$

The image processor 40 extracts, as feature points, pixels with the luminance gradient Mc equal to or greater than a feature-point threshold Mp_th according to the equation (2) below. The feature-point threshold Mp_th, which is used to extract feature points of an object in each image, may be set by experiment or simulation.

$$Mc \geq Mp\_th \qquad (2)$$

Subsequently, at step S130, the image processor 40 generates optical flows OP based on the featured points extracted at step S120. For example, the image processor 40 generates optical flows OP using the block matching method. An optical flow OP is a movement vector from a feature point extracted in the previous processing cycle τ(n−1) to a feature point extracted in the current processing cycle τ(n) corresponding to the feature point extracted in the previous processing cycle τ(n−1).

More specifically, for each image acquired in the current processing cycle τ(n), the image processor 40 scans the image using, as a template, a pixel block centered at each one of feature points (pixels) acquired in the previous processing cycle τ(n−1). The image processor 40 calculates, for each pixel of the template, a difference between a luminance value of the pixel of the template and a luminance value of a pixel of the image acquired in the current processing cycle τ(n) corresponding to the pixel of the template. The image processor 40 then calculates a sum of absolute differences (SAD) in luminance value between the template and each corresponding pixel block of the image acquired in the current processing cycle τ(n), thereby estimating a degree of similarity between the feature point acquired in the previous processing cycle τ(n−1) and each feature point extracted in the current processing cycle τ(n).

The image processor 40 connects each feature point extracted in the previous processing cycle τ(n−1) and the feature point extracted in the current processing cycle τ(n) that provides a minimum of the calculated SAD, that is, a maximum degree of similarity to the feature point extracted in the previous processing cycle τ(n−1), thereby generating optical flows OP of the feature points extracted in the previous processing cycle τ(n−1). In the present embodiment, the image processor 40 changes the resolution σi, i.e., the Pyramid level, of each image acquired from the input unit 32 and generates optical flows OP of feature points in the image at each resolution σi.

Subsequently, at step S140, the image processor 40 determines the reliability of each optical flow OP generated at step S130. More specifically, the image processor 40 selects optical flows OP that indicate with relatively high reliability that the object in the image is a moving object. To describe selection of such optical flows OP, some terms need to be defined as follows. The number of times each other corresponding optical flows OP have been generated in succession in consecutive processing cycles T is referred to as a tracked number of times Nt. The image processor 40 increments the tracked number of times Nt by one each time an optical flow OP corresponding to the previously generated one is generated in consecutive processing cycles τ. A U-directional coordinate component of an optical flow OP is referred to as a flow U-component ΔU, and a V-directional coordinate component of the optical flow OP is referred to as a flow V-component ΔV. A length of an optical flow OP is referred to as a flow length Lf. A flow length Lf of an optical flow OP calculated based on the flow U-component ΔU and the flow V-component ΔV of the optical flow OP minus a flow length of an optical flow OP corresponding to a distance traveled by the vehicle 90 is referred to as a corrected flow-length Lc (which may be referred to as an "ego-canceled flow-length"). An angle between an optical flow OP and a U-directional axis is referred to as a flow angle θf. A flow angle of an optical flow OP generated in the current processing cycle τ(n) minus a flow angle of an optical flow OP generated in the previous processing cycle τ(n−1) is referred to as a flow-direction difference Δθf. A corner degree Rf is an indication of whether there is a corner with two distinct edges.

The image processor 40 selects, from the optical flows OP generated from the images at respective resolutions σi, optical flows OP generated from the images at the resolution σi equal to or higher than a resolution threshold σi_th as expressed in the following inequality (3-1).

$$\sigma i \geq \sigma i\_th \qquad (3\text{-}1)$$

The image processor 40 selects optical flows OP with the tracked number of times Nt equal to or greater than the tracked-number threshold Nt_th as expressed in the following inequality (3-2) from the optical flows OP.

$$Nt \geq Nt\_th \qquad (3\text{-}2)$$

The image processor 40 calculates a flow length Lf of each optical flow OP based on a flow U-component ΔU and a flow V-component ΔV of the optical flow OP as expressed in the following inequality (3-3).

$$Lf=\sqrt{(\Delta U)^2+(\Delta V)^2} \qquad (3\text{-}3)$$

The image processor 40 selects, from the optical flows OP selected above, optical flows OP with the flow length Lf equal to or greater than a flow-length threshold Lf_th as expressed in the following inequality (3-4).

$$Lf \geq Lf\_th \qquad (3\text{-}4)$$

The image processor 40 acquires an own-vehicle speed Vc and a steering angle θs from the vehicle speed sensor 15 and the steering angle sensor 16 via the in-vehicle LAN 60 and the communication unit 31. Based on the own-vehicle speed Vc, the steering angle θs, and a period of processing cycle τ, the image processor 40 calculates a vehicle movement vector ΔL that is a movement vector of the vehicle 90 during the processing cycle T in a 3D (three-dimensional) spatial coordinate system. Based on the orientation, a focal length, a position and an angle relative to a road surface of each of the front camera 11, the rear camera 12, the left camera 13, and the right camera 14, the image processor 40 translates the vehicle movement vector ΔL from the 3D spatial coordinate system into the UV coordinate system of the image, thereby calculating the flow length Lf corresponding to the vehicle movement vector ΔL. The image processor 40 calculates a corrected flow-length Lc by subtracting the flow length Lf corresponding to the vehicle movement vector ΔL from the flow length Lf calculated based on the flow U-component ΔU and the flow V-component ΔV.

The image processor 40 selects, from the optical flows OP selected above, optical flows OP with the corrected flow-length Lc equal to or greater than a flow-length threshold Lc_th as expressed in the following inequality (3-5).

$$Lc \geq Lc\_th \qquad (3\text{-}5)$$

The image processor 40 calculates a flow angle θf based on the flow U-component ΔU and the flow V-component ΔV of each optical flow OP according to the following equation (3-6).

$$\theta f = \tan^{-1}\left(\frac{\Delta V}{\Delta U}\right) \quad (3\text{-}6)$$

The image processor 40 calculates a flow-direction difference Δθf based on the calculated flow angles θf according to the following equation (3-7). The image processor 40 selects, from the optical flows OP selected above, optical flows OP with the flow-direction difference Δθf equal to or less than a flow-direction difference threshold Δθf_th according to the following inequality (3-8). It should be noted that the optical flow OP generated in the current processing cycle τ(n) is a movement vector of a feature point extracted in the previous processing cycle τ(n−1). Therefore, in the equation (3-7), the flow angle θf calculated in the current processing cycle τ(n) is expressed as θf(n−1). Similarly, the optical flow OP generated in the previous processing cycle τ(n−1) is a movement vector of a feature point extracted in the processing cycle τ(n−2) previous to the processing cycle τ(n−1). Therefore, in the equation (3-7), the flow angle θf calculated in the previous processing cycle τ(n−1) is expressed as θf(n−2).

$$\Delta\theta f = \theta f(n-1) - \theta f(n-2) \quad (3\text{-}7)$$

$$\Delta\theta f \leq \Delta\theta f\_th \quad (3\text{-}8)$$

The image processor 40 calculates, using the Harris's corner detection method, a corner degree Rf of each feature point from which an optical flow OP was generated. More specifically, the image processor 40 calculates a corner degree Rf using the Hessian matrix H as expressed by the following equation (3-9). As noticed in the equation (3-9), the Hessian matrix H is formed of components based on Iu and Iv. Iu is, as described above, a U-directional gradient of the input luminance Ic(U, V), which is calculated by the filter 33. Iv is, as described above, a V-directional gradient of the input luminance Ic(U, V), which is calculated by the filter 33. λ1 and λ2 are eigenvalues of the Hessian matrix H, where k is a constant of, for example, 0.04-0.06.

$$H = \begin{bmatrix} Iu^2 & Iu \times Iv \\ Iu \times Iv & Iv^2 \end{bmatrix} \quad (3\text{-}9)$$

$$Rf = \det(H) - k \times (\text{trace}(H))^2$$

$$\det(H) = \lambda 1 \times \lambda 2$$

$$\text{trace}(H) = \lambda 1 + \lambda 2$$

The image processor 40 selects, from the optical flows OP selected above, optical flows OP with the corner degree Rf equal to or greater than a corner threshold Rf_th as expressed in the following inequality (3-10).

$$Rf \geq Rf\_th \quad (3\text{-}10)$$

As above, the image processor 40 determines the reliability of the optical flows OP. As described below, optical flows OP with relatively high reliability that the object in the image is a moving object are selected.

For example, a flow length Lf of a stationary object corresponds to an own-vehicle speed Vc, leading to a relatively small flow length Lf. A flow length Lf of a moving object corresponds to an own-vehicle speed Vc and a movement speed of the moving object, leading to a relatively large flow length Lf. This is because optical flows OP with the flow length Lf equal to or greater than the flow length threshold Lf_th are selected. In addition, optical flows OP with the corrected flow-length Lc equal to or greater than the flow-length threshold Lc_th are selected. Further, a flow-direction difference Δθf of an object moving in a single direction is relatively small. This is because optical flows OP with the flow-direction difference Δθf equal to or less than the direction difference threshold Δθf_th are selected. This allows, for example, optical flows OP of a moving object in the image to be selected. In addition, optical flows OP of a stationary object in the image are removed from the optical flows OP calculated in the current processing cycle τ(n). The flow length threshold Lf_th, the flow-length threshold Lc_th, and the flow-direction difference threshold Δθf_th are set by experiment, simulation, or the like.

As described above, optical flows OP are generated in each image at each resolution σi. Optical flows OP generated in the image at each resolution σi equal to or higher than the resolution threshold σi_th are selected. Optical flows OP with the tracked number of times Nt equal to or greater than the tracked-number threshold Nt_th are generated. This leads to higher accuracy of the optical flows OP, thus leading to higher accuracy of the flow length Lf, the flow-direction difference Δθf, and the corrected flow-length Lc. The resolution threshold σi_th and the tracked-number threshold Nt_th are set by experiment, simulation, or the like.

Of moving objects, feet of a person, such as a pedestrian, are in contact with a road surface. Therefore, optical flows OP of feet of a person are used to detect a distance from the vehicle 90 to the pedestrian. Optical flows OP with the corner degree Rf greater than the corner threshold Rf_th are selected. This can facilitate selection of the optical flows OP of feet of a person. The corner threshold Rf_th is set by experiment, simulation, or the like.

Figure 7:
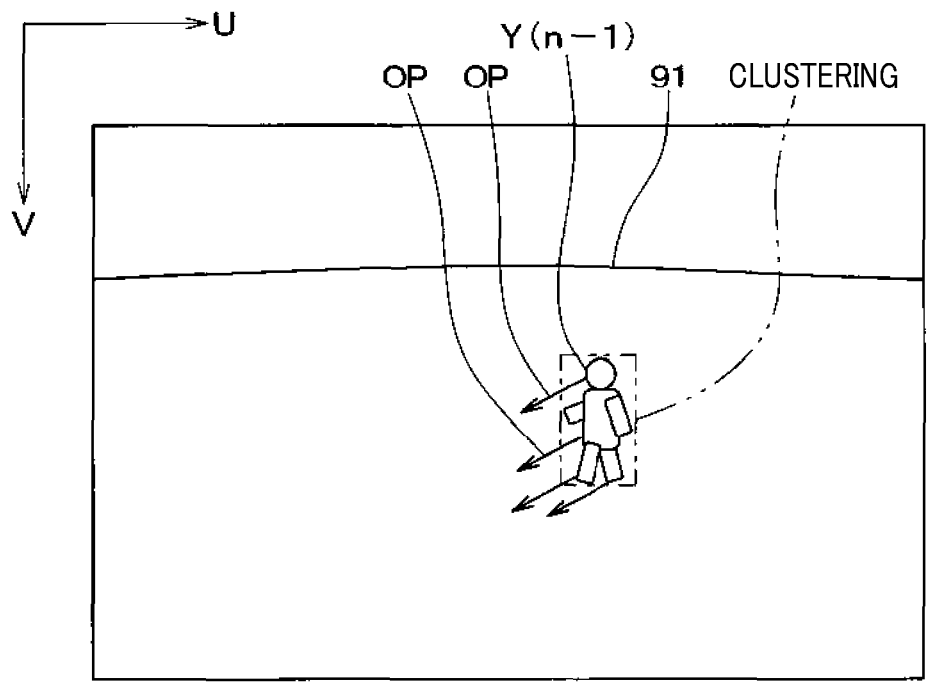
FIG. 7 is an illustration of clustering optical flows.

Subsequently, at step S150, the image processor 40 classifies the optical flows OP selected at step S140 into groups, thereby performing clustering. More specifically, the image processor 40 groups together optical flows OP having similar pixel positions, similar flow lengths Lf, and similar flow angles θf in the image acquired in the previous processing cycle τ(n−1). For example, the image processor 40 groups together optical flows OP such that their flow lengths Lf are within a predetermined length range, their flow angles θf are within a predetermined angle range, and any distance between their feature points in the image acquired in the previous processing cycle τ(n−1) are within a predetermined distance range. The image processor 40 groups together the extracted optical flows OP as illustrated in FIG. 7. FIG. 7 illustrates one object Y(n−1) represented by a cluster of extracted optical flows OP indicated by dashed-two dotted line.

Subsequently, at step S160, the image processor 40 calculates physical quantities of each group of feature points in the image acquired in the previous processing cycle τ(n−1). The image processor 40 calculates, for each of the groups, a position of the group in the 3D spatial coordinate system, a length and a width representing the size of the group, and a movement vector of the group. More specifically, based on the orientation, the focal length, the position and the angle relative to a road surface of each of the front camera 11, the rear camera 12, the left camera 13, and the right camera 14, the image processor 40 performs a coordinate translation from the UV coordinate system into the 3D spatial coordinate system. The image processor 40 translates the feature points and the optical flows OP of each group in the UV coordinate system into the 3D spatial coordinate system. Based on the translated feature points, the image processor 40 calculates, for each group, a representative position Pr of the group, and a length and a width representing the size of the group. Based on the translated optical flows OP, the image processor 40 calculates a representative movement vector Or for each group. The representative position Pr is, for example, a center of mass of the object. If the object is a pedestrian, the representative position Pr may be a position of feet of the pedestrian.

Figure 8:
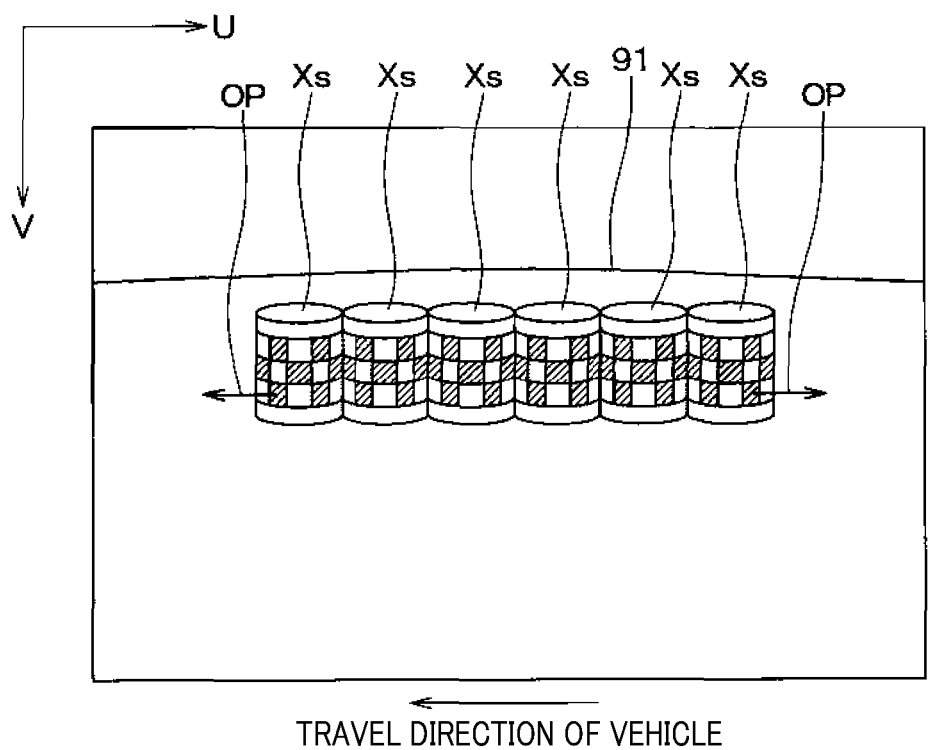
FIG. 8 is an illustration of optical flows of a regular-pattern object.
Figure 9:
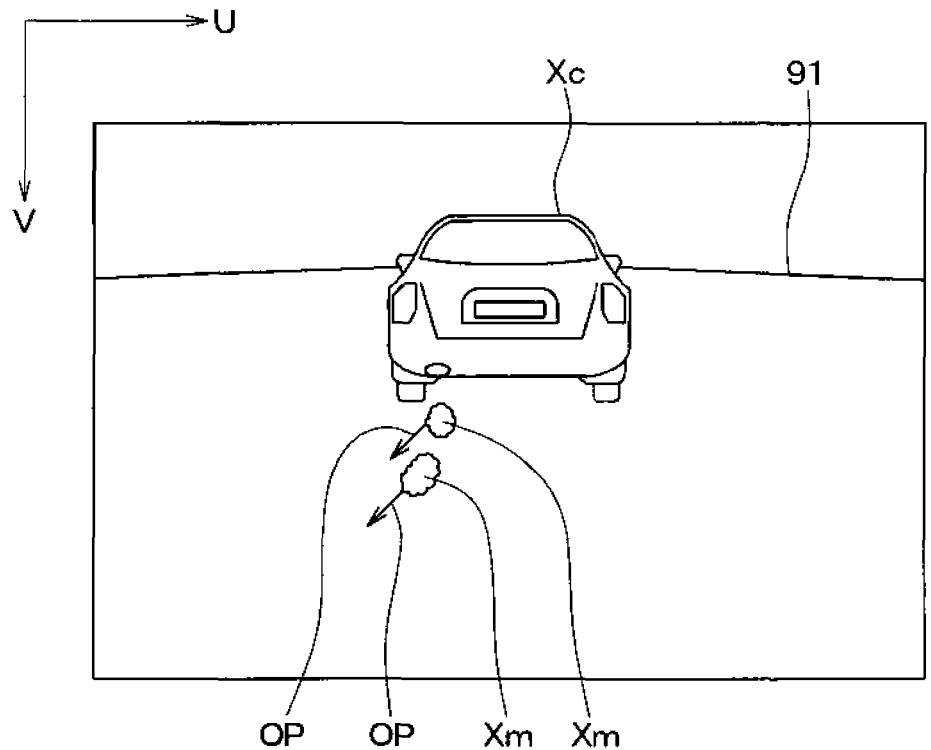
FIG. 9 is an example of misty objects.

As illustrated in FIG. 8, optical flows OP of a stationary object are typically oriented in the opposite direction to the travel direction of the vehicle 90. However, if the object is a stationary object having a regular or substantially regular pattern, such as a fence, the SAD may be minimized at step S130, that is, the degree of similarity may be maximized, between a feature point in the previous processing cycle τ(n−1) and a feature point in the current processing cycle τ(n) that does not correspond to the feature point in the previous processing cycle τ(n−1). Thus, at step S130, the feature point in the previous processing cycle τ(n−1) and the feature point in the current processing cycle τ(n) that should correspond to the feature point in the previous processing cycle τ(n−1) may be mistakenly determined to not correspond to each other. At step S130, despite the object being a stationary object, a length of the optical flow OP of the stationary object having a regular or substantially regular pattern may be different from a length of an optical flow OP of another type of stationary object. In addition, the direction of the optical flow OP of the stationary object having a regular or substantially regular pattern may be different from the opposite direction to the travel direction of the vehicle 90. This may cause the stationary object having a regular or substantially regular pattern to be mistakenly recognized as a moving object. In addition, as illustrated in FIG. 9, if the moving object is a fluid, such as a misty object including a liquid and a gas, optical flows OP of the misty object will be output, which may cause the misty object to be mistakenly recognized as a person, a preceding vehicle or the like. In FIG. 8, stationary objects having a regular or substantially regular pattern is indicated by Xs. In FIG. 9, the preceding vehicle is indicated by Xc, and the misty object by Xm.

Figure 10:
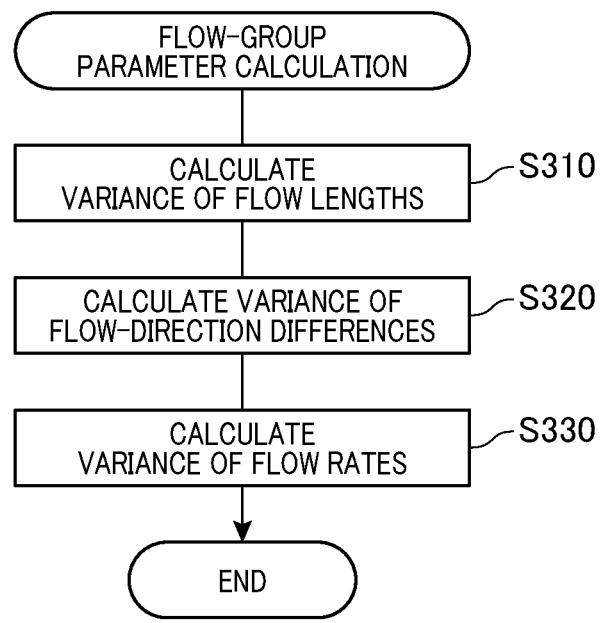
FIG. 10 is a subflowchart of parameter calculation performed by the image processor.

At step S150, an object corresponding to a cluster of optical flows may be one of a stationary object having a regular or substantially regular pattern, a misty object, and a moving object. At step S165 subsequent to step S160, to identify which one of a stationary object, a misty object, and a moving object the object is, the image processor 40 calculates parameters described later for each group. More specifically, for each group of optical flows OP clustered at step S150, the image processor 40 calculates, as a degree of variability in the optical flows OP of the group, a variance of flow lengths Lf, a variance of flow-direction differences Δθf, and a variance of flow rates Vf described later. In the following, calculation of these parameters will be described with reference to the subflowchart of FIG. 10. For illustration purpose, a stationary object having a regular or substantially regular pattern will be referred to as a regular-pattern object.

At step S310, for each group of optical flows OP clustered at step S150, the image processor 40 extracts, from the flow lengths Lf calculated at step S140, flow lengths Lf corresponding to the group of optical flows OP. The image processor 40 calculates an average of flow lengths Lf for the group based on the extracted flow lengths Lf and the number of optical flows OP of the group. The image processor 40 calculates a variance of flow lengths Lf of the group based on the extracted flow lengths Lf, the calculated average of the flow lengths Lf, and the number of optical flows OP of the group.

At step S320, for each group of optical flows OP clustered at step S150, the image processor 40 extracts, from the flow-direction differences Δθf calculated at step S140, flow-direction differences Δθf corresponding to the group of optical flows OP. The image processor 40 calculates an average of flow-direction differences Δθf for the group based on the extracted flow-direction differences Δθf and the number of optical flows OP of the group. The image processor 40 calculates a variance of flow-direction differences Δθf of the group based on the extracted flow-direction differences Δθf, the calculated average of the flow-direction differences Δθf, and the number of optical flows OP of the group.

Subsequently, at step S330, the image processor 40 calculates, based on the extracted flow lengths Lf and the period of the processing cycle τ, a flow rate Vf corresponding to each optical flow OP according to the following equation (4).

$$Vf = Lf/\tau \quad (4)$$

The image processor 40 calculates, for each group of optical flows OP clustered at step S150, an average of flow rates Vf of the group based on the calculated flow rates Vf and the number of optical flows OP of the group. The image processor 40 calculates a variance of the flow rates Vf of the group based on the calculated average of the flow rates Vf and the number of optical flows OP of the group.

In this manner described above, at step S165, the image processor 40 calculates the variance of the flow lengths Lf, the variance of the flow-direction differences Δθf, and the variance of the flow rates Vf for each group of optical flows OP clustered at step S150.

At step S170 subsequent to step S165, the image processor 40 determines, based on the respective parameters calculated at step S165, whether the object is a regular-pattern object or a moving object. If determining that the object is a moving object, the image processor 40 further determines whether the moving object is a fluid, such as a misty object including a liquid and a gas, or an obstacle, such as a person, a preceding vehicle or the like.

Figure 11:
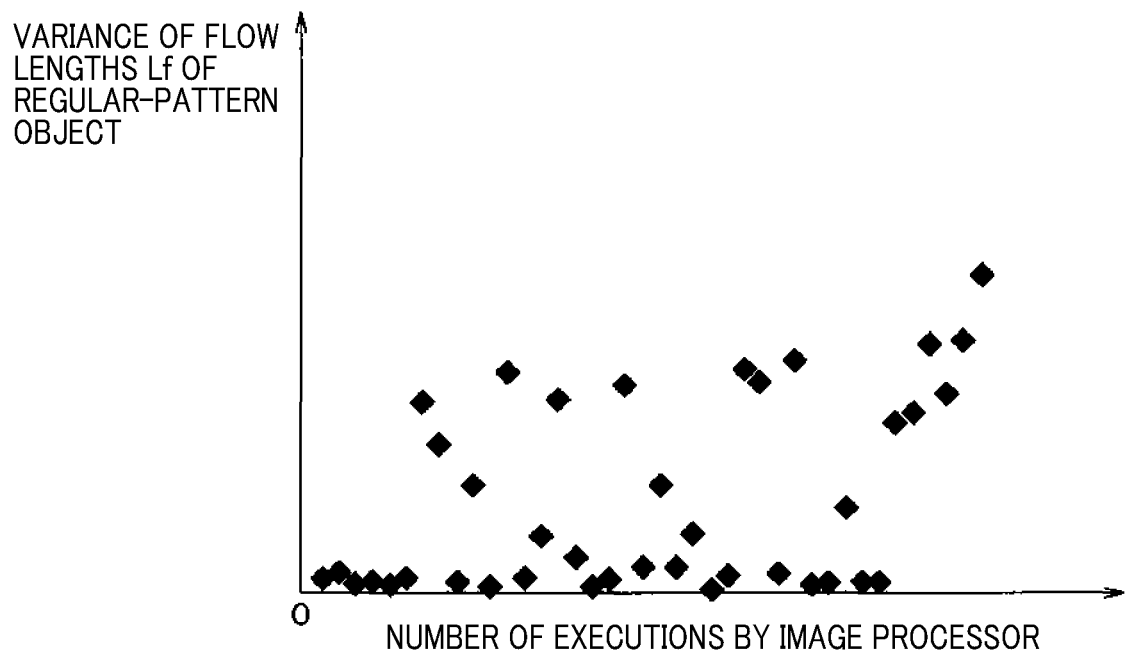
FIG. 11 is an example relationship between the number of executions by the image processor and variance of flow lengths of a regular-pattern object.
Figure 12:
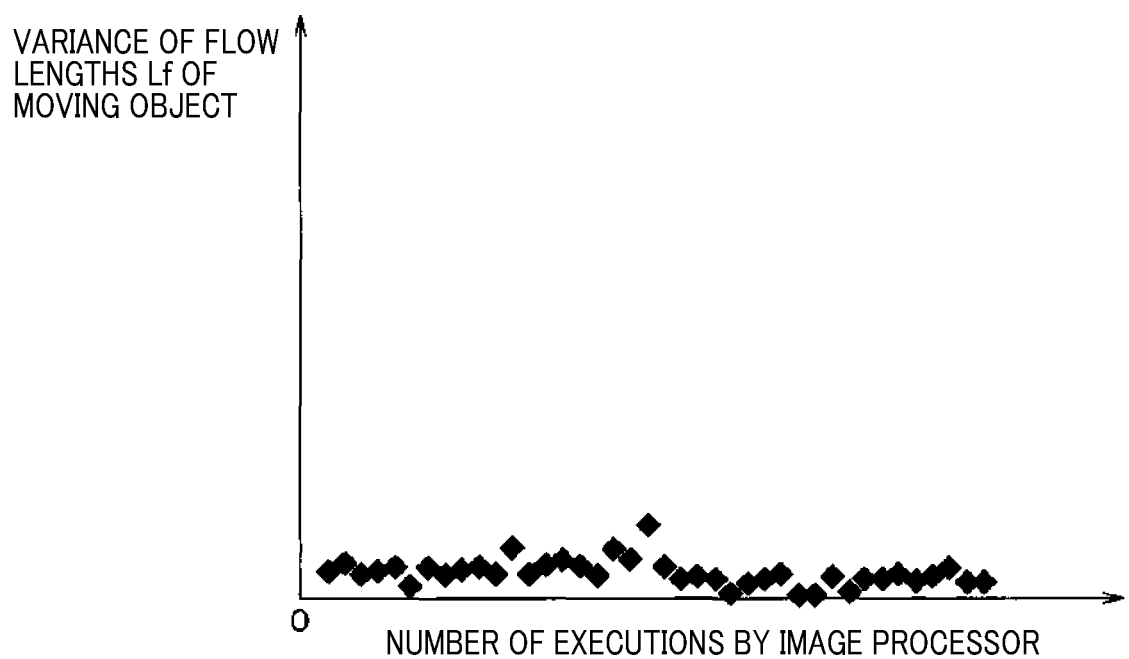
FIG. 12 is an example relationship between the number of executions by the image processor and variance of flow lengths of a moving object.

For example, as described above, if the object is a regular-pattern object, the feature point extracted in the previous processing cycle τ(n−1) and the feature point extracted in the current processing cycle τ(n) that should correspond to the same feature point in the previous processing cycle τ(n−1) may be mistakenly determined to not correspond to each other. This may lead to relatively large variations in the variance of the flow lengths Lf of the group of optical flows OP clustered corresponding to the regular-pattern object with the number of executions by the image processor 40, as illustrated in FIG. 11. If the object is a moving object, the feature points of the moving object move evenly in the image. This may lead to relatively small variations in the variance of the flow lengths Lf of the group of optical flows OP clustered corresponding to the moving object with the number of executions by the image processor 40, as illustrated in FIG. 12.

Therefore, the image processor 40 extracts, from the groups of optical flows OP clustered at step S150, a group of optical flows OP with the variance of the flow lengths Lf calculated at step S165 greater than the threshold. The image processor 40 determines the extracted group of optical flows OP as a regular-pattern object if corresponding groups of optical flows OP have been extracted in succession in the previous processing cycle τ(n−1) and the next previous processing cycle τ(n−2). That is, if each other corresponding groups of optical flows OP with the variance of the flow lengths Lf greater than the threshold have been extracted in succession a predetermined number Ns of times or more in the current processing cycle τ and the consecutive processing cycles T previous to the current processing cycle, the image processor 40 determines the extracted group of optical flows OP as a regular-pattern object. The image processor 40 extracts, from the groups of optical flows OP clustered at step S150, a group of optical flows OP with the variance of the flow lengths Lf calculated at step S165 equal to or less than the threshold, and determines the extracted group of optical flows OP as a moving object (this condition is herein referred to as a first condition). The threshold for the variance of the flow lengths Lf may be set by experiment or simulation. The predetermined number Ns is a positive integer equal to or greater than two.

Figures 13, 14:
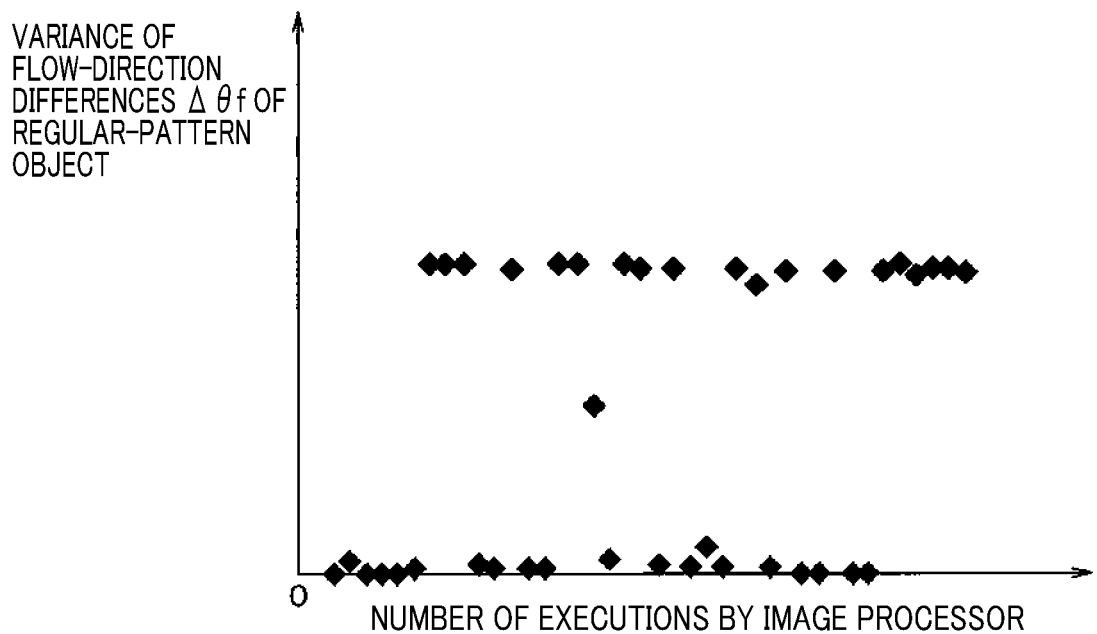
FIG. 13 is an example relationship between the number of executions by the image processor and variance of flow-direction differences of a regular-pattern object.
FIG. 14 is an example relationship between the number of executions by the image processor and variance of flow-direction differences of a moving object.

In addition, as described above, if the object is a regular-pattern object, the optical flows OP of the stationary object is oriented in a different direction from the travel direction of the vehicle 90. This may lead to relatively large variations in the variance of the flow-direction differences Δθf of the group of optical flows OP clustered corresponding to the regular-pattern object with the number of executions by the image processor 40, as illustrated in FIG. 13. If the object is a moving object, the feature points of the moving object move evenly in the image. This may lead to relatively small variations in the variance of the flow-direction differences Δθf of the group of optical flows OP clustered corresponding to the moving object with the number of executions by the image processor 40, as illustrated in FIG. 14.

Therefore, the image processor 40 extracts, from the groups of optical flows OP clustered at step S150, a group of optical flows OP with the variance of the flow-direction differences Δθf calculated at step S165 greater than the threshold. The image processor 40 determines the extracted group of optical flows OP as a regular-pattern object if corresponding groups of optical flows OP have been extracted in succession in the previous processing cycle τ(n−1) and the next previous processing cycle τ(n−2). That is, if each other corresponding groups of optical flows OP with the variance of the flow-direction differences Δθf greater than the threshold have been extracted in succession a predetermined number Ns of times or more in the current processing cycle τ and the consecutive processing cycles T previous to the current processing cycle, the image processor 40 determines the extracted group of optical flows OP as a regular-pattern object. The image processor 40 extracts, from the groups of optical flows OP clustered at step S150, a group of optical flows OP with the variance of the flow-direction differences Δθf calculated at step S165 equal to or less than the threshold, and determines the extracted group of optical flows OP as a moving object (this condition is herein referred to as a second condition). The threshold for the variance of the flow-direction differences Δθf may be set by experiment, simulation or the like. In the present embodiment, the image processor 40 determines a group of optical flows OP clustered at step S150 with either one of the first and second conditions met as a regular-pattern object.

In such a manner, a determination as to whether the object is a regular-pattern object or a moving object is made.

Figure 15:
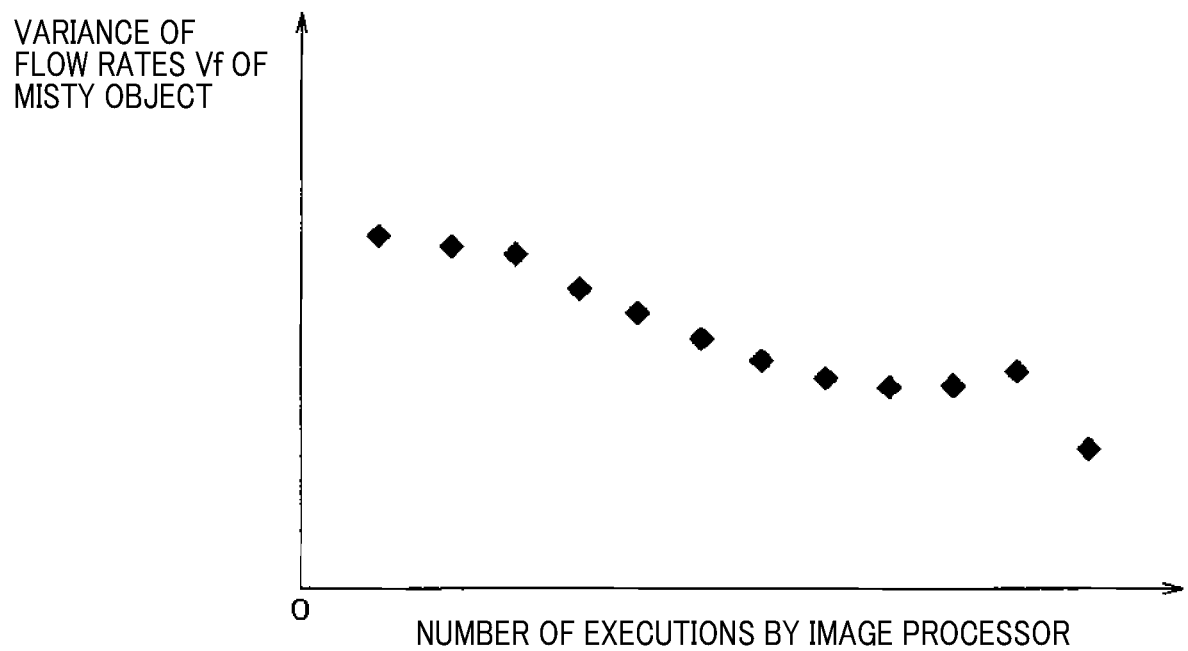
FIG. 15 is an example relationship between the number of executions by the image processor and variance of flow rates of a misty object.
Figure 16:
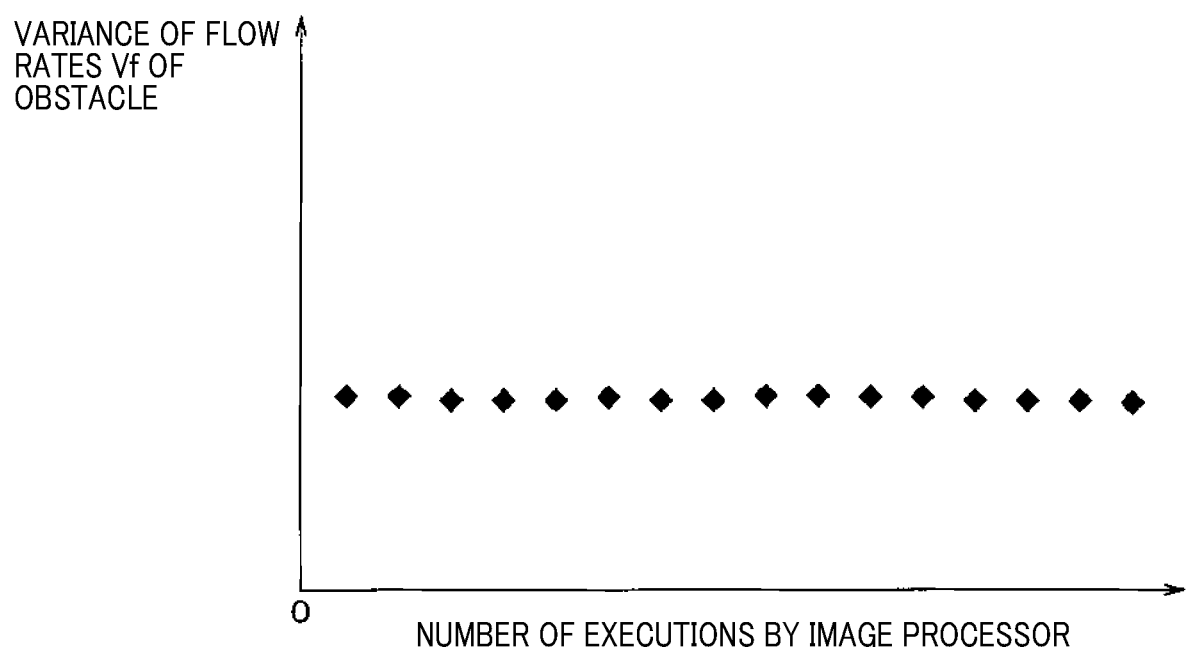
FIG. 16 is an example relationship between the number of executions by the image processor and variance of flow rates of an obstacle.

If the moving object is a misty object, changes in speed and size of the misty object can easily occur depending on environments, such as winds or the like, around the vehicle 90, which may lead to relatively large variations in the variance of the flow rates Vf for the group of optical flows OP clustered corresponding to the moving object with the number of executions by the image processor 40, as illustrated in FIG. 15. If the object is an obstacle, such as a person, a preceding vehicle or the like, the feature points of the obstacle move evenly in the image and sudden changes in flow rates Vf are less likely to occur. This may lead to relatively small variations in the variance of the flow rates Vf for the group of optical flows OP clustered corresponding to the obstacle with the number of executions by the image processor 40, as illustrated in FIG. 16.

The image processor 40 extracts, from the groups of optical flows OP determined to correspond to a moving object, a group of optical flows OP with the variance of the flow rates Vf calculated at step S165 greater than a threshold. The image processor 40 determines the extracted group of optical flows OP as a misty object if corresponding groups of optical flows OP have been extracted in succession in the previous processing cycle τ(n−1) and the next previous processing cycle τ(n−2). That is, if each other corresponding groups of optical flows OP with the variance of the flow rates Vf greater than the threshold have been extracted in succession a predetermined number Ns of times or more in the current processing cycle τ and the consecutive processing cycles T previous to the current processing cycle, the image processor 40 determines the extracted group of optical flows OP as a misty object. The image processor 40 extracts, from the groups of optical flows OP determined to correspond to a moving object, a group of optical flows OP with the variance of the flow rates Vf calculated at step S165 equal to or less than the threshold, and determines the extracted group of optical flows OP as an obstacle, such as a person, a preceding vehicle or the like. The threshold for the variance of the flow rates Vf may be set by experiment, simulation or the like.

In this manner, a determination as to whether the moving object is a misty object or an obstacle is made.

At step S180 subsequent to step S170, the image processor 40 stores in the RAM of the storage 34 each group determined to correspond to an obstacle at step S170. The process flow returns to step S110.

At step S190 subsequent to step S170, the image processor 40 stores in the RAM of the storage 34 each group determined to correspond to a regular-pattern object at step S170 as a non-obstacle object. The image processor 40 stores in the RAM of the storage 34 each group determined to correspond to a misty object at step S170 as a non-obstacle object. The process flow returns to step S110.

In the obstacle identification system 10, the image processor 40 is configured to identify objects around the vehicle 90 in the manner described above.

It will now be described that, in the obstacle identification system 10, the accuracy of identifying objects can be increased.

As illustrated in FIG. 11, a group of optical flows OP clustered corresponding to a regular-pattern object have relatively large variations in the variance of the flow lengths Lf with the number of executions by the image processor 40, which allows the image processor 40 to identify whether the object is a regular-pattern object or a moving object based on the variance of the flow lengths Lf of each group of optical flows OP clustered at step S150. More specifically, the image processor 40 extracts, from the groups of optical flows OP clustered at step S150, a group of optical flows OP with the variance of the flow lengths Lf calculated at step S165 greater than the threshold, and determines the extracted group of optical flows OP as a regular-pattern object. The image processor 40 extracts, from the groups of optical flows OP clustered at step S150, a group of optical flows OP with the variance of the flow lengths Lf calculated at step S165 equal to or less than the threshold, and determines the extracted group of optical flows OP as a moving object. This allows a determination to be made as to whether the object is a regular-pattern object or a moving object, which leads to increased accuracy in identifying objects.

The obstacle identification apparatus 30 described above can provide the following advantages (A1)-(A4).

(A1) As illustrated in FIG. 13, variations in the variance of the flow-direction differences Δθf of the group of optical flows OP clustered corresponding to a regular-pattern object with the number of executions by the image processor 40 are relatively large, which allows the image processor 40 to identify whether the object is a regular-pattern object or a moving object based on the variance of the flow-direction differences Δθf of each of the groups of optical flows OP clustered at step S150. More specifically, the image processor 40 extracts, from the groups of optical flows OP clustered at step S150, a group of optical flows OP with the variance of the flow-direction differences Δθf calculated at step S165 greater than the threshold, and determines the extracted group of optical flows OP as a regular-pattern object. The image processor 40 extracts, from the groups of optical flows OP clustered at step S150, a group of optical flows OP with the variance of the flow-direction differences Δθf calculated at step S165 equal to or less than the threshold, and determines the extracted group of optical flows OP as a moving object. This allows a determination to be made as to whether the object is a regular-pattern object or a moving object, which leads to increased accuracy in identifying objects.

(A2) As illustrated in FIG. 15, variations in the variance of the flow rates Vf of the group of optical flows OP clustered corresponding to a misty object with the number of executions by the image processor 40 are relatively large, which allows the image processor 40 to identify whether the object is a misty object or an obstacle based on the variance of the flow rates Vf of each of the groups of optical flows OP clustered at step S150. More specifically, the image processor 40 extracts, from the groups of optical flows OP clustered at step S150, a group of optical flows OP with the variance of the flow rates Vf calculated at step S165 greater than the threshold, and determines the extracted group of optical flows OP as a misty object. The image processor 40 extracts, from the groups of optical flows OP clustered at step S150, a group of optical flows OP with the variance of the flow rates Vf calculated at step S165 equal to or less than the threshold, and determines the extracted group of optical flows OP as an obstacle. This allows a determination to be made as to whether the object is a misty object or an obstacle, which leads to increased accuracy in identifying objects.

(A3) The image processor 40 selects optical flows OP generated at the step S130 based on the resolution σi, the tracked number of times Nt, the flow length Lf, the corrected flow-length Lc, the flow-direction difference Δθf, and the corner degree Rf, which allows for selection of optical flows OP with relatively high reliability that the object of interest is a moving object.

(A4) The image processor 40 extracts feature points based on the luminance gradients Mc, which facilitates extraction of feature points and allows for extraction of relatively many necessary feature points.

Modifications

The present disclosure should not be limited to the embodiments described above and can be modified as deemed appropriate. The above-described embodiments are not independent from one another, and some of them can be combined as deemed appropriate unless such a combination is unreasonable. Needless to say, in the above-described embodiments, the components of the embodiments should not be necessarily deemed to be essential unless explicitly described or they are fundamentally and obviously essential, for example.

The image processor and its method described in relation to the present disclosure may be implemented by a dedicated computer that is provided by forming an image processor and a memory programmed to execute one or more functions embodied by a computer program. Otherwise, the image processor and its method described in relation to the present disclosure may be implemented by a dedicated computer that is provided by forming a processor from one or more dedicated hardware logic circuits. Alternatively, the image processor and its method described in relation to the present disclosure may be implemented by one or more dedicated computers that are formed by a combination of a processor and a memory programmed to execute one or more functions and one or more hardware logic circuits. The computer program may be stored as instructions to be executed by a computer in a computer-readable non-transitory tangible recording medium.

(1) In the above embodiment, the image processor 40 calculates the SAD between a pixel block centered at a feature point in the previous processing cycle τ(n−1) and a pixel block centered at a feature point in the current processing cycle τ(n) to estimate a degree of similarity between these two feature points. In an alternative embodiment, the image processor 40 may calculate a sum of squared differences (SSD) between a pixel block centered at a feature point in the previous processing cycle τ(n−1) and a pixel block centered at a feature point in the current processing cycle τ(n) to estimate a degree of similarity between these two feature points. In a still alternative embodiment, the image processor 40 may calculate a normalized cross correlation (NCC) between a pixel block centered at a feature point in the previous processing cycle τ(n−1) and a pixel block centered at a feature point in the current processing cycle τ(n) to estimate a degree of similarity between these two feature points.

(2) In the above embodiment, the Sobel filter is used as the filter 33 to calculate U-directional image gradient components and V-directional image gradient components. In an alternative embodiment, the differential filter, the Prewitt filter, or the Roberts filter or the like may be used as the filter 33 to calculate U-directional image gradient components and V-directional image gradient components.

(3) In the above embodiment, for each group of optical flows OP clustered at step S150, the image processor 40 calculates, as a degree of variability in the optical flows OP of the group, a variance of flow lengths Lf, a variance of flow-direction differences Δθf, and a variance of flow rates Vf. In an alternative embodiment, for each group of optical flows OP clustered at step S150, the image processor 40 calculates, as a degree of variability in the optical flows OP of the group, a standard deviation of flow lengths Lf, a standard deviation of flow-direction differences Δθf, and a standard deviation of flow rates Vf. In a still alternative embodiment, for each group of optical flows OP clustered at step S150, the image processor 40 calculates, as a degree of variability in the optical flows OP of the group, changes per processing cycle τ in each of the average of the flow lengths Lf, the average of the flow-direction differences Δθf, and the average of the flow rates Vf of each group.

What is claimed is:

1. An apparatus for identifying an obstacle around a vehicle, comprising:
   a non-transitory memory storing one or more computer programs; and
   a processor executing the one or more computer programs to:
   acquire an image captured by a camera mounted to the vehicle;
   extract feature points of the image;
   generate, for each of the feature points of the image acquired before a current time, an optical flow that is a movement vector from a feature point acquired before the current time to a corresponding feature point of the image acquired at the current time;
   classify optical flows into groups based on pixel positions of the feature points; and
   identify, for each of the groups, whether an object corresponding to a group of optical flows in the image is a stationary object, in which the stationary object comprises a regular or substantially regular pattern, or a moving object based on a degree of variability in lengths of the optical flows of the group relative to lengths of other optical flows of the group.

2. The apparatus according to claim 1, wherein the processor further executes the one or more computer programs to identify, in response to a degree of variability in lengths of the optical flows that are classified into a group being greater than a threshold, that the object corresponding to the group in the image is a stationary object with a regular or substantially regular pattern, and identify, in response to a degree of variability in lengths of the optical flows that are classified into a group being equal to or less than the threshold, that the object corresponding to the group in the image is a moving object.

3. The apparatus according to claim 1, wherein a change in angle of an optical flow is referred to as a flow-direction difference of the optical flow, and
   the processor further executes the one or more computer programs to identify, for each of the groups that the optical flows are classified into, whether an object corresponding to the group in the image is a stationary object with a regular or substantially regular pattern or a moving object based on a degree of variability in flow-direction differences of the optical flows of the group.

4. The apparatus according to claim 3, wherein the processor further executes the one or more computer programs to identify, in response to a degree of variability in flow-direction differences of the optical flows that are classified into a group being greater than a threshold, that the object corresponding to the group in the image is a stationary object with a regular or substantially regular pattern, and identify, in response to a degree of variability in flow-direction differences of the optical flows that are classified into a group being equal to or less than the threshold, that the object corresponding to the group in the image is a moving object.

5. The apparatus according to claim 1, wherein the processor further executes the one or more computer programs to identify whether a moving object in the image is a misty object or an obstacle based on a degree of variability in flow rates of the optical flows of the group corresponding to the moving object.

6. The apparatus according to claim 5, wherein the processor further executes the one or more computer programs to identify, in response to a degree of variability in flow rates of the optical flows that are classified into a group being greater than a threshold, that the object corresponding to the group in the image is a misty object, and identify, in response to a degree of variability in flow rates of the optical flows that are classified into a group being equal to or less than the threshold, that the object corresponding to the group in the image is an obstacle.

7. The apparatus according to claim 1, wherein the processor further executes the one or more computer programs to:
   calculate a first gradient which is a gradient of luminance values of pixels in a first direction of the image and a second gradient which is a gradient of luminance values of pixels in a second direction orthogonal to the first direction of the image;
   select optical flows based on a length of each optical flow, a flow-direction difference which is a change in angle of each optical flow, a resolution of the image, a tracked number of times of each optical flow which is incremented by one each time the optical flow is generated corresponding to an optical flow generated before the current time, a corner degree of each feature point based on the first gradient and the second gradient, a corrected flow-length of each optical flow that is a length of the optical flow minus a length of an optical flow corresponding to a traveled distance of the vehicle; and
   classify the optical flows that are selected into groups.

8. The apparatus according to claim 7, wherein the first gradient and the second gradient are calculated using a Sobel filter.

9. The apparatus according to claim 7, wherein the processor further executes the one or more computer programs to extract the feature points based on a positive root of a sum of squares of the first gradient and the second gradient.

10. The apparatus according to claim 1, wherein the processor further executes the one or more computer programs to classify the optical flows into groups based on lengths of the optical flows and angles of the optical flows.

11. A method for identifying an obstacle around a vehicle, comprising:
    acquiring an image captured by a camera mounted to the vehicle;
    extracting feature points of the image;
    generating, for each of the feature points of the image acquired before a current time, an optical flow that is a movement vector from a feature point acquired before the current time to a corresponding feature point of the image acquired at the current time;
    classifying optical flows into groups based on pixel points of the feature points; and
    identifying, for each of the groups, whether an object in the image is a stationary object, in which the stationary object comprises a regular or substantially regular pattern, or a moving object based on a degree of variability in lengths of the optical flows of a group relative to lengths of other optical flows of the group.

* * * * *